(12) United States Patent
Lai

(10) Patent No.: US 6,731,340 B1
(45) Date of Patent: May 4, 2004

(54) SURFACE-MOUNT VIDEO CAMERA ADAPTED TO BE MOUNTED ON AND USED WITH A PERSONAL COMPUTER

(75) Inventor: Tsai-Tien Lai, Taipei Hsien (TW)

(73) Assignee: Mitac International Corp., Hsinchu (TW)

( * ) Notice: Subject to any disclaimer, the term of this patent is extended or adjusted under 35 U.S.C. 154(b) by 0 days.

(21) Appl. No.: 09/390,559

(22) Filed: Sep. 3, 1999

(51) Int. Cl.⁷ ............................................... H04N 5/225
(52) U.S. Cl. ...................................................... 348/373
(58) Field of Search .......................... 348/373, 207.99, 348/207.1, 207.11, 376; D16/202

(56) References Cited

U.S. PATENT DOCUMENTS

| | | | | |
|---|---|---|---|---|
| 3,638,502 A | * | 2/1972 | Leavitt et al. | 348/373 |
| 6,124,892 A | * | 9/2000 | Nakano | 348/373 |
| 6,147,701 A | * | 11/2000 | Tamura et al. | 348/373 |
| 6,356,308 B1 | * | 3/2002 | Hovanky | 348/373 |

FOREIGN PATENT DOCUMENTS

| | | | | |
|---|---|---|---|---|
| JP | 02066492 A | * | 3/1990 | G12B/9/08 |
| JP | 10169892 A | * | 6/1998 | F16M/11/12 |

* cited by examiner

*Primary Examiner*—Wendy R. Garber
*Assistant Examiner*—Jason Whipkey
(74) *Attorney, Agent, or Firm*—Ladas & Parry

(57) ABSTRACT

A surface mount-video camera includes a video camera body with a lens oriented in a longitudinal direction, and a seat body to be mounted on a personal computer. The seat body includes an upper seat portion with a mounting hole defining a rotating axis transverse to the longitudinal direction. An anchored body has a lower cylindrical portion inserted rotatably and retainingly in the mounting hole about the rotating axis and downwardly beyond an inner annular engaging portion of the seat body, and a flange portion extending outwardly and radially from the lower cylindrical portion to be slidably rotatable relative to an outer annular engaging portion of the seat body. A first knuckle member is disposed on the flange portion with a hinging axis thereof extending in a direction transverse to both the rotating axis and the longitudinal direction of the lens. A pin shaft has a fixed end received securely in the first knuckle member, and a mounting end extending outwardly of the first knuckle member along the hinging axis to be hingeably provided with a second knuckle member. The video camera body is connected to the second knuckle member by a coupling member. As such, the video camera body can be rotated about the rotating axis and the hinging axis so as to adjust the longitudinal direction of the lens.

2 Claims, 4 Drawing Sheets

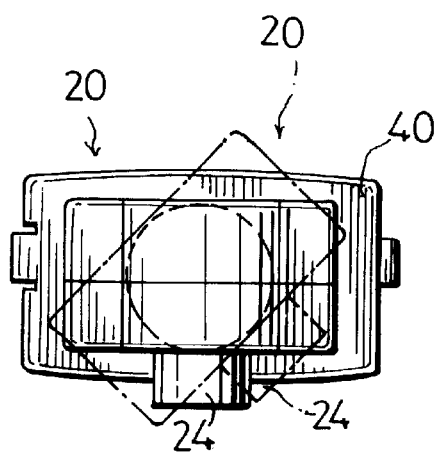
F I G. 4
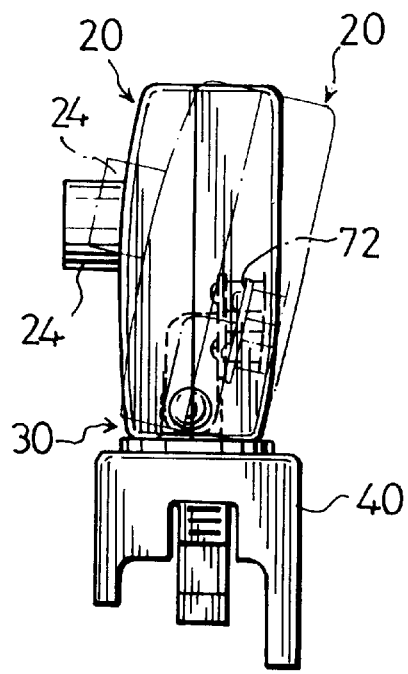
F I G. 5

SURFACE-MOUNT VIDEO CAMERA ADAPTED TO BE MOUNTED ON AND USED WITH A PERSONAL COMPUTER

BACKGROUND OF THE INVENTION

1. Field of the Invention

This invention relates to a surface-mount video camera, more particularly to a surface-mount video camera adapted to be mounted on and used with a personal computer.

2. Description of the Related Art

Referring to FIG. 1, a conventional surface mount video camera 10 is shown to have a clamp member 12 to clamp securely a personal computer (not shown). The connection as such is liable to result in removal of the video camera 10 from the personal computer. In addition, it is inconvenient to adjust the camera 10 to desired a position and angle during use.

SUMMARY OF THE INVENTION

The object of the present invention is to provide a surface-mount video camera which can be secured on a personal computer firmly and which can be easily adjusted to a desired angle relative to the personal computer.

According to this invention, the surface-mount video camera includes a video camera body with a lens which is oriented in a longitudinal direction, and a seat body which is adapted to be mounted on a personal computer, and which includes an upper seat portion. The upper seat portion has upper and lower walls opposite to each other in an upright direction transverse to the longitudinal direction of the lens, and a mounting hole which defines a rotating axis parallel to the upright direction. The upper and lower walls are formed respectively with outer and inner annular engaging portions which define the mounting hole. An anchored body has a lower cylindrical portion which is rotatably insertable into the mounting hole about the rotating axis and downwardly beyond the inner annular engaging portion, and a flange portion which extends outwardly and radially from the lower cylindrical portion to be slidably rotatable relative to the outer annular engaging portion. A retaining member is disposed between the lower cylindrical portion and the inner annular engaging portion such that the lower cylindrical portion is retainingly and rotatably slidable relative to the inner annular engaging portion when the lower cylindrical portion is inserted into the mounting hole. A first knuckle member is disposed on the flange portion with a hinging axis thereof extending in a direction transverse to both the rotating axis and the longitudinal direction of the lens. A pin shaft is received securely in the first knuckle member at one end, and extends outwardly of the first knuckle member along the hinging, axis at the other end. A second knuckle member is hingeably mounted on the mounting end of the pin shaft. A coupling member is mounted on the second knuckle member at an end thereof, and is secured to the video camera body at an opposite end. As such, the video camera body can be rotated about the rotating axis and the hinging axis so as to adjust the longitudinal direction of the lens conveniently.

BRIEF DESCRIPTION OF THE DRAWINGS

Other features and advantages of the present invention will become apparent in the following detailed description of the preferred embodiment of the invention, with reference to the accompanying drawings, in which:

FIG. 4 is a top view of the preferred embodiment when adjusted about a rotating axis; and FIG. 5 is a side view of the preferred embodiment when adjusted about a hinging axis.

DETAILED DESCRIPTION OF THE PREFERRED EMBODIMENT

Figure 1:
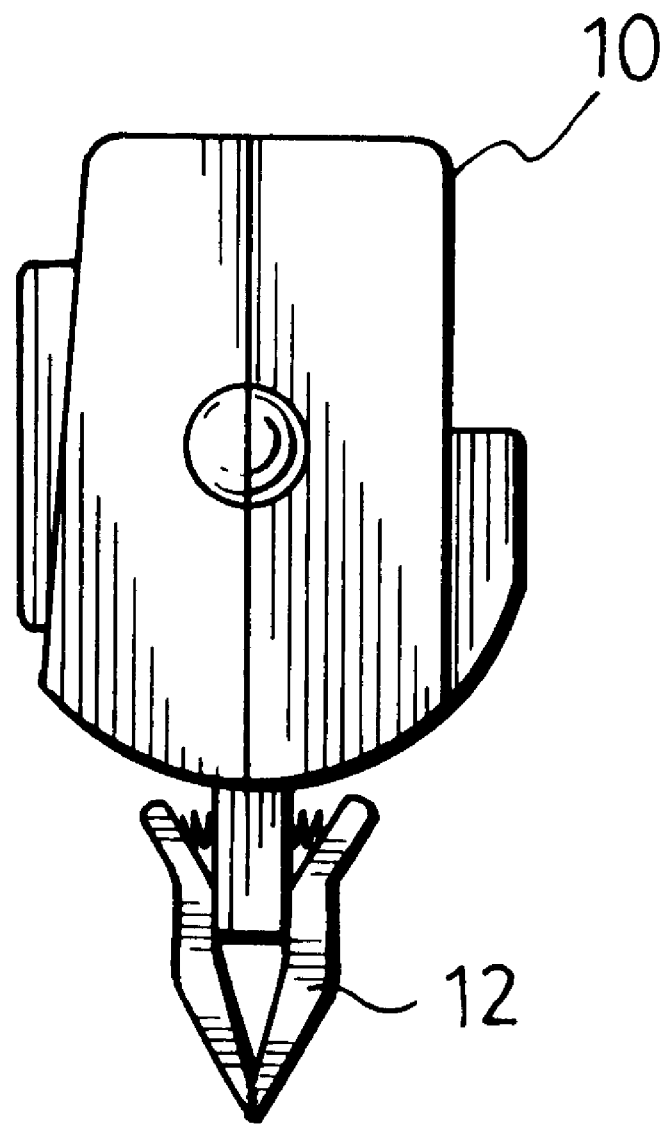
FIG. 1 is a schematic view of a conventional surface-mount video camera.
Figure 2:
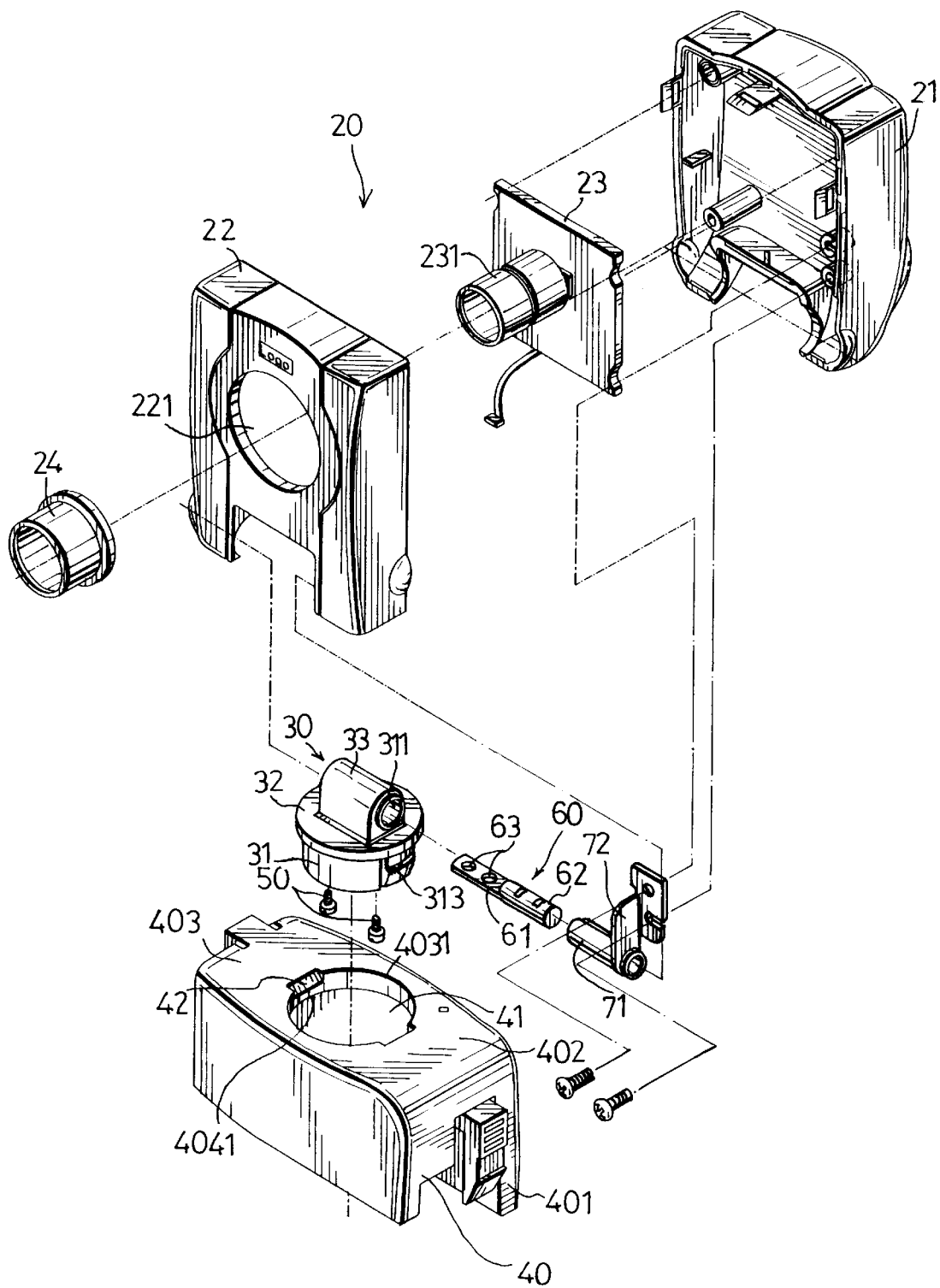
FIG. 2 is an exploded view of a preferred embodiment of a surface-mount video camera according to this invention.
Figure 3:
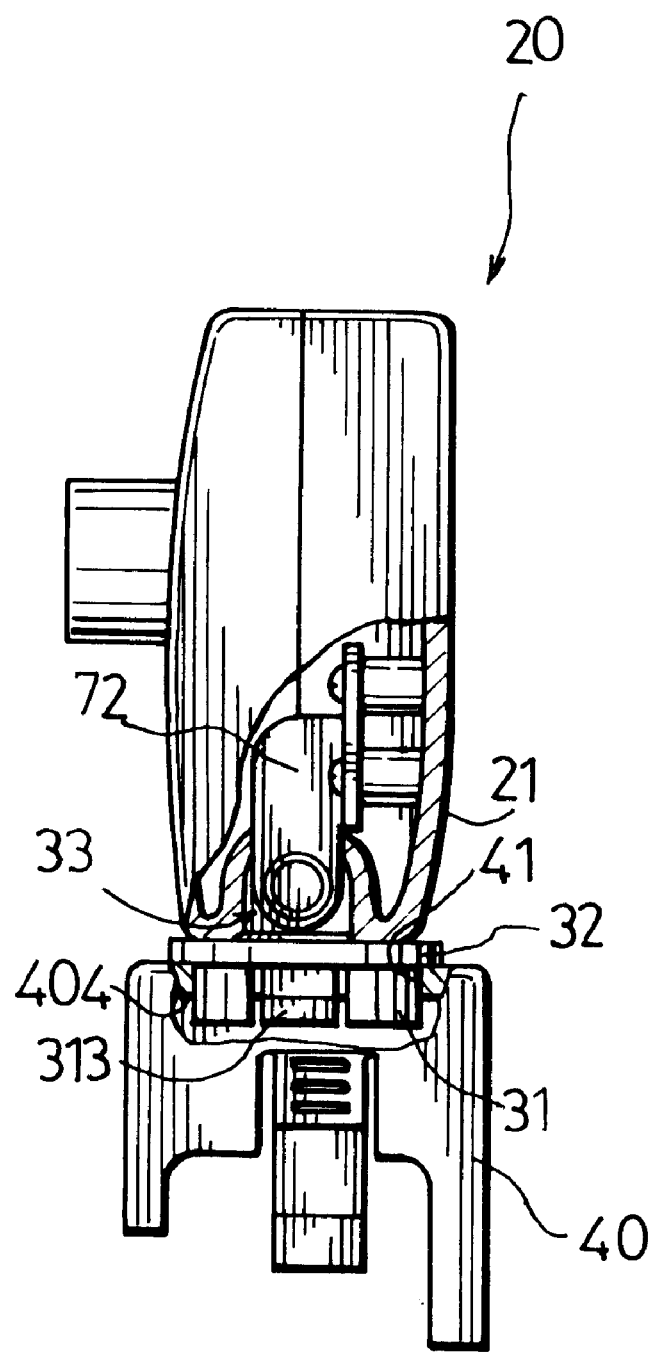
FIG. 3 is a side, partly sectional schematic view of the preferred embodiment.

Referring to FIGS. 2 and 3, the preferred embodiment of the surface mount video camera according to the present invention is shown to comprise a video camera body 20, an anchored body 30, a pin shaft 60, and a seat body 40.

The video camera body 20 includes a back cover 21, a front faceplate 22 with a central hole 221, and a camera module 23 disposed between the back cover 21 and the front faceplate 22 and which has a lens 231 extending in a longitudinal direction through the central hole 221 so as to engage an aperture ring member 24.

The anchored body 30 has a lower cylindrical portion 31, and a flange portion 32 which extends outwardly and radially from the lower cylindrical portion 31. A retaining member 313 is disposed on the lower cylindrical portion 31. A first knuckle member 33 is disposed on the flange portion 32 with a hinging hole 311 along a hinging axis.

The pin shaft 60 has a fixed end 61 which is received in the hinging hole 311 and which is secured to the first knuckle member 33 in such a manner that a plurality of screw fasteners 50 are inserted into through holes 63 in the fixed end 61, and a mounting end 62 which extends outwardly of the first knuckle member 33 along the hinging axis. A second knuckle member 71 is hingeably mounted on the mounting end 62 of the pin shaft 60. A coupling member 72 has a first end which engages the second knuckle member 71 distal to the first knuckle member 33, and a second end which extends from the first end in an upright direction to be secured to the back cover 21 of the video camera body 20 such that the longitudinal direction of the lens 231 is transverse to the hinging axis.

The seat body 40 includes a bottom support 401 which is adapted to be mounted on a personal computer (not shown), and an upper seat portion 402 which is spaced apart from the bottom support 401 in the upright direction. The upper seat portion 402 has upper and lower walls 403,404 opposite to each other, and a mounting hole 41 which defines a rotating axis parallel to the upright direction transverse to the hinging axis of the first knuckle member 33. The upper and lower walls 403,404 are formed respectively with outer and inner annular engaging portions 4031,4041, which define the mounting hole 41. In addition, a pair of opposite inclined surfaces 42 are formed on the outer annular engaging portion 4031.

In assembly, when the lower cylindrical portion 31 of the anchored body 30 is inserted rotatably in the mounting hole 41 about the rotating axis to extend beyond the inner annular engaging portion 4041 with the guidance of the inclined surfaces 42, the flange portion 32 is disposed on and is slidably rotatable relative to the outer annular engaging portion 4031. At the same time, the retaining member 313 is disposed between the lower cylindrical portion 31 and the inner annular engaging portion 4041 so that the lower cylindrical portion 31 is retainingly and rotatably slidable relative to the inner annular engaging portion 4041.

With reference to FIG. 4, by rotating the lower cylindrical portion 31 in the mounting hole 41 relative to the seat body 40 about the rotating axis, the video camera body 20 can be rotated relative to the personal computer. Thus, the longitudinal direction of the lens 231 can be adjusted about the rotating axis.

In addition, with reference to FIG. 5, since the second knuckle member 71 is hingeably mounted on the mounting end 62 of the pin shaft 60, the coupling member 72, which is secured to the video camera body 20, is rotatable about the hinging axis of the first knuckle member 33. That is, the inclination of the video camera body 20 relative to the anchored body 30 is changeable. Therefore, the longitudinal direction of the lens 231 can be adjusted about the hinging axis.

As mentioned above, the surface-mount video camera of this invention can be secured firmly on a personal computer, and the longitudinal direction of the lens thereof can be adjusted to be located at a desired position and angle.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A surface-mount video camera adapted to be mounted on and used with a personal computer, comprising:

a seat body including a bottom support adapted to be mounted on the personal computer, and an upper seat portion spaced apart from said bottom support in an upright direction, said upper seat portion having upper and lower walls opposite to each other in said upright direction, and a mounting hole defining a rotating axis parallel to said upright direction, said upper and lower walls being form respectively with outer and inner annular engaging portions which define said mounting hole;

an anchored body having a lower cylindrical portion of such a dimension as to be rotatably insertable into said mounting hole about said rotating axis and downwardly beyond said inner annular engaging portion, and a flange portion disposed to extend outwardly and radially from said lower cylindrical portion and distal to said inner annular engaging portion when said lower cylindrical portion is inserted in said mounting hole, such that said flange portion is slidably rotatable relative to said outer annular engaging portion;

a retaining member disposed between said lower cylindrical portion and said inner annular engaging portion such that said lower cylindrical portion will be retainingly and rotatably slidable relative to said inner annular engaging portion when said lower cylindrical portion is inserted into said mounting hole and downwardly beyond said inner annular engaging portion;

a first knuckle member disposed on said flange portion with a hinging axis thereof extending in a direction transverse to said rotating axis;

a pin shaft having a fixed end received in and secured to said first knuckle member, and a mounting end extending outwardly of said first knuckle member along said hinging axis;

a second knuckle member hingeably mounted on said mounting end of said pin shaft;

a video camera body with a lens oriented in a longitudinal direction; and a coupling member having a first end mounted on said second knuckle member distal to said first knuckle member, and a second end secured to said video camera body such that said longitudinal direction of said lens is transverse to both said hinging axis and said rotating axis.

2. The surface-mount video camera as claimed in claim 1, wherein said seat body further has a pair of inclined surfaces formed on said outer annular engaging portion for guiding insertion of said lower cylindrical portion into said mounting hole.

\* \* \* \* \*